(12) United States Patent
Tripp et al.

(10) Patent No.: US 9,262,309 B2
(45) Date of Patent: Feb. 16, 2016

(54) OPTIMIZING TEST DATA PAYLOAD SELECTION FOR TESTING COMPUTER SOFTWARE APPLICATIONS THAT EMPLOY DATA SANITIZERS AND DATA VALIDATORS

(71) Applicant: International Business Machines Corporation, Armonk, NY (US)

(72) Inventors: Omer Tripp, Bronx, NY (US); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 14/040,797

(22) Filed: Sep. 30, 2013

(65) Prior Publication Data

US 2015/0095893 A1  Apr. 2, 2015

(51) Int. Cl.
*G06F 11/00* (2006.01)
*G06F 11/36* (2006.01)

(52) U.S. Cl.
CPC ........ *G06F 11/3688* (2013.01); *G06F 11/3668* (2013.01); *G06F 11/3684* (2013.01)

(58) Field of Classification Search
CPC ............ G06F 11/3668; G06F 11/3677; G06F 11/3684; G06F 11/3688
See application file for complete search history.

(56) References Cited

U.S. PATENT DOCUMENTS

| | | | |
|---|---|---|---|
| 8,141,158 B2 | 3/2012 | Calendino et al. | |
| 8,166,158 B2 * | 4/2012 | Schneider et al. | 709/224 |
| 8,302,080 B2 | 10/2012 | Wassermann et al. | |
| 8,719,233 B2 * | 5/2014 | Gandhi et al. | 707/692 |
| 8,898,776 B2 * | 11/2014 | Molnar et al. | 726/22 |
| 2006/0080554 A1 * | 4/2006 | McDonald et al. | 713/189 |
| 2013/0007885 A1 | 1/2013 | Haviv et al. | |

FOREIGN PATENT DOCUMENTS

CN  101902470 A  12/2010

OTHER PUBLICATIONS

Scholte et al., "Preventing Input Validation Vulnerabilities in Web Applications through Automated Type Analysis", IEEE 36th International Conference on Computer Software and Applications (COMPSAC), 2012; pp. 233-pp. 243; 11 pages.

* cited by examiner

*Primary Examiner* — Charles Ehne
(74) *Attorney, Agent, or Firm* — Cantor Colburn LLP; Edward Choi

(57) ABSTRACT

Testing computer software applications is implemented by probing a computer software application to determine the presence in the computer software application of any data-checking features, and applying a rule to the data-checking features that are determined to be present in the computer software application, thereby producing a testing set of inputs. The testing set includes any sets of inputs that were used to test sets of data-checking software, where each of the sets of data-checking software includes one or more data sanitizers and/or data validators, and where the rule is configured to produce the testing set to include one or more of the sets of inputs when the rule is applied to any of the data-checking features. The computer software application is tested using the testing set.

12 Claims, 5 Drawing Sheets

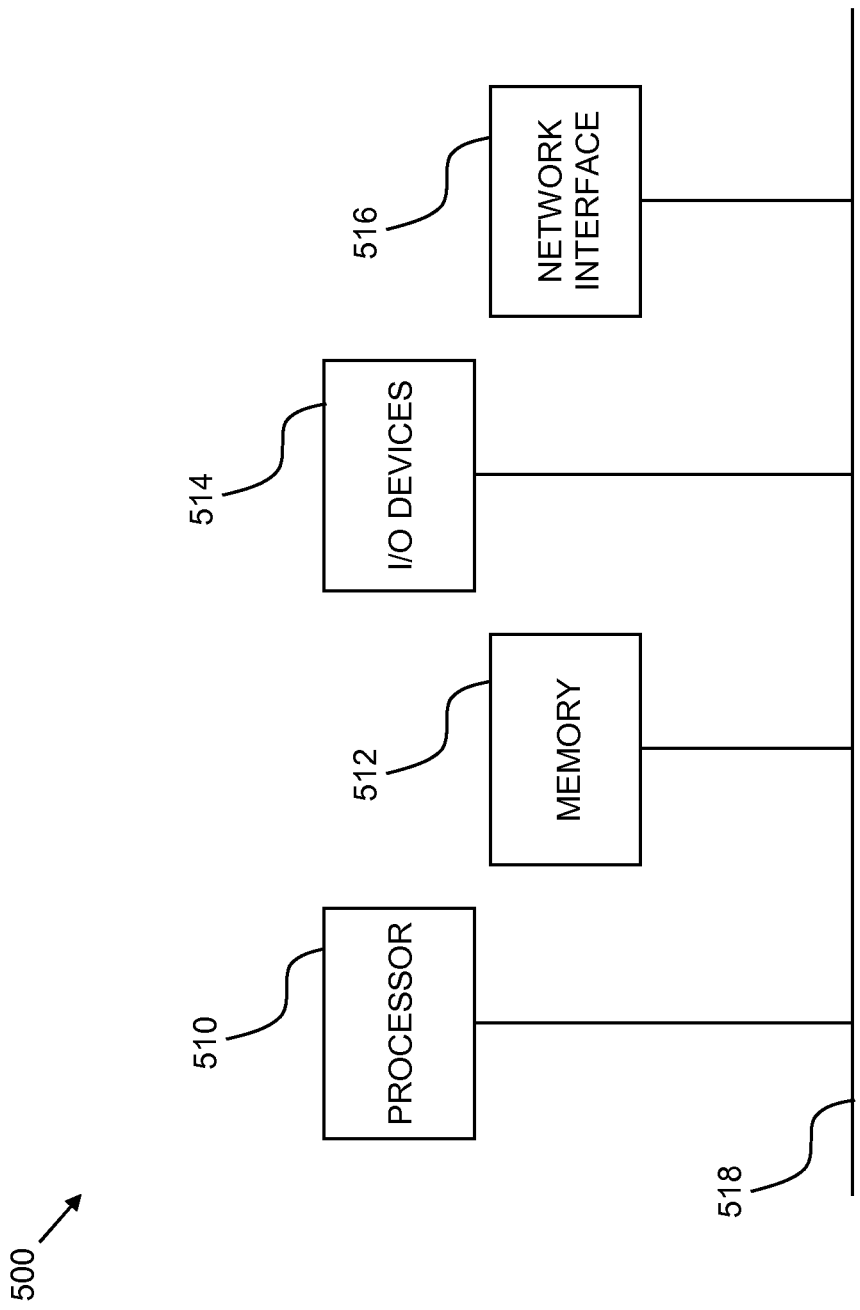

OPTIMIZING TEST DATA PAYLOAD SELECTION FOR TESTING COMPUTER SOFTWARE APPLICATIONS THAT EMPLOY DATA SANITIZERS AND DATA VALIDATORS

BACKGROUND

The invention relates to computer software testing in general and, more particularly, to optimizing test data payload selection for testing computer software applications that employ data sanitizers and data validators.

Dynamic analysis tools are often used by computer software developers to test computer software applications, typically by first exploring a computer software application to discover its interfaces, including those by which data may be provided to the application, and then by interacting with the application's interfaces and monitoring the application's responses to such interactions. In one type of dynamic analysis a computer software application is tested for security vulnerabilities by providing test data designed to exploit a security vulnerability as input to the application, and then observing the behavior of the application. For example, dynamic analysis may be used to test a web application that is accessed over a computer network, such as the Internet, by employing a "black-box tester" running on one computer that sends HTTP requests via a computer network as input to the web application that is hosted by another computer. The HTTP requests are configured with test data payloads drawn from a library of test data payloads designed to test for security vulnerabilities such as SQL injection, cross-site scripting, and command injection.

Computer software developers often employ measures to defend against such attacks by incorporating data sanitizers, which transform input, and/or data validators, which test whether input is legal, into their applications where such inputs are processed. However, their choice of sanitizers and validators might not be sufficient to prevent all kinds of attacks. While a black-box tester could send all possible test data payloads to a computer software application to test for all possible security vulnerabilities, the cost of sending many HTTP requests via a computer network is high in terms of time and bandwidth, and therefore commercial black-box testers that test web applications via computer networks typically send only a few dozen test payloads per HTTP parameter being tested in order to keep such costs down. Unfortunately, this often means that some security vulnerabilities go undetected.

SUMMARY

In one embodiment, a method is provided for testing computer software applications. The method includes probing a computer software application to determine the presence in the computer software application of any data-checking features, and applying a rule to the data-checking features that are determined to be present in the computer software application, thereby producing a testing set of inputs. The testing set includes at least one member selected from sets of inputs that were used to test sets of data-checking software, where each of the sets of data-checking software includes one or more data sanitizers and/or data validators, and where the rule is configured to produce the testing set to include one or more of the sets of inputs when the rule is applied to any of the data-checking features. The method also includes testing the computer software application using the testing set.

In other embodiments, systems and computer program products are also provided.

BRIEF DESCRIPTION OF THE SEVERAL VIEWS OF THE DRAWINGS

The embodiments of the present invention will be understood and appreciated more fully from the following detailed description taken in conjunction with the appended drawings in which:

FIG. 5 is a simplified block diagram illustration of an exemplary hardware implementation of a computing system, constructed and operative in accordance with an embodiment of the invention.

DETAILED DESCRIPTION

Figure 1:
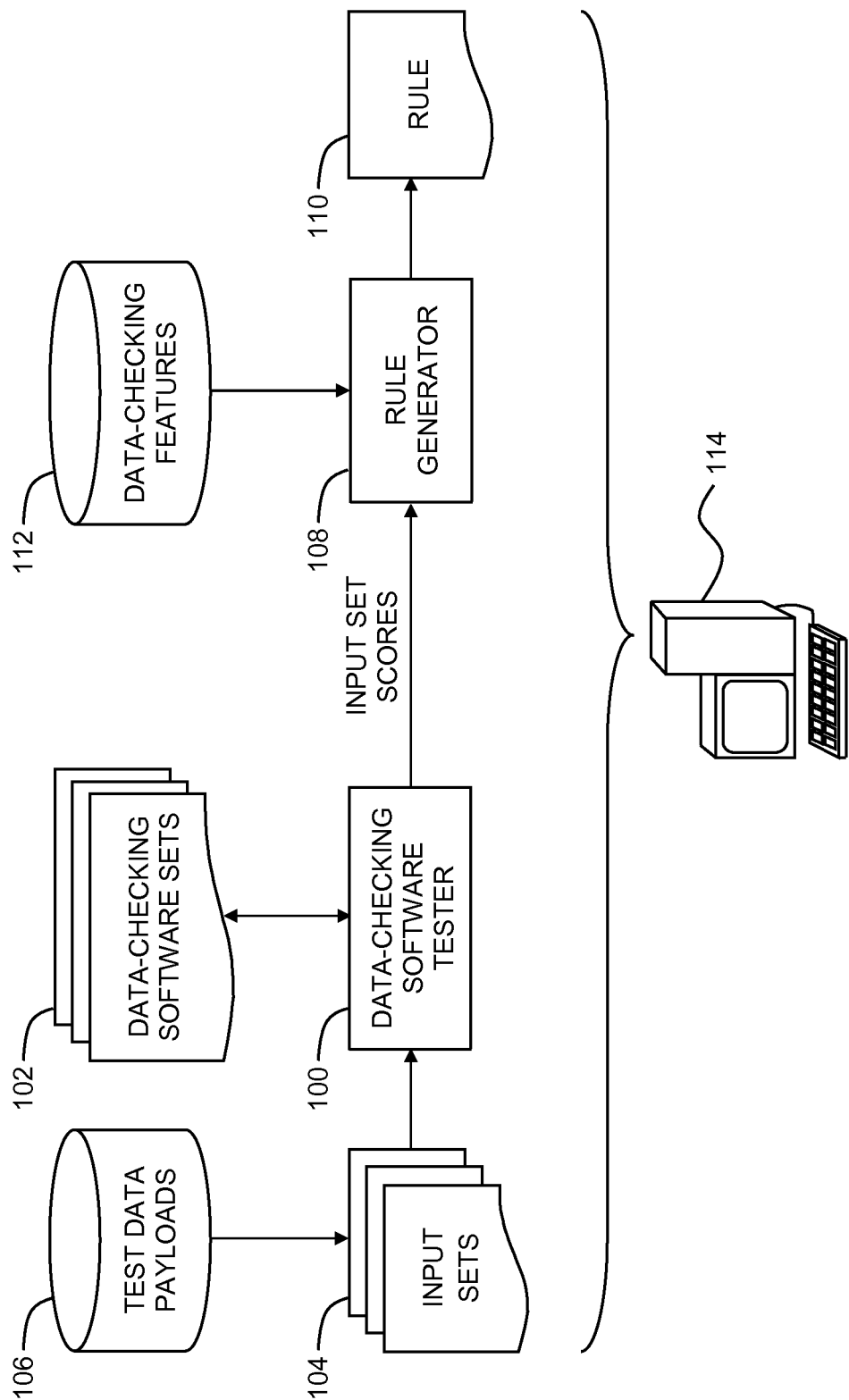
FIG. 1 is a simplified conceptual illustration of a system for preparing for testing a computer software application, constructed and operative in accordance with an embodiment of the invention.

Embodiments of the present invention will now be described. The description is intended to be illustrative, and is not to be construed as limiting the invention to the embodiments shown. It is appreciated that various modifications may occur to those skilled in the art that, while not specifically shown herein, are nevertheless within the true spirit and scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for preparing for testing a computer software application, constructed and operative in accordance with an embodiment of the invention. In the system of FIG. 1, a data-checking software tester 100, such as IBM Security AppScan™, commercially-available from International Business Machines Corporation, Armonk, N.Y., is configured to test multiple sets of data-checking software 102 using multiple sets of inputs 104. Each of the sets of data-checking software 102 includes at least one data sanitizer or data validator, where any of the sets of data-checking software 102 may include one or more data sanitizers and/or one or more data validators. Such data sanitizers include any software that endorses input to a computer software application for further processing by the computer software application by subjecting the input to mutation criteria, typically where an input string is mapped to an output string for further processing by the computer software application. Such data validators include any software that endorses input to a computer software application for further processing by the computer software application by subjecting the input to validation criteria, typically where an input string is mapped to a Boolean value indicating whether the input may be further processed by the computer software application. One example of such data-checking software includes framework configuration files in which custom validators for input parameters are declaratively defined. For example, in Apache Struts 2™, commercially available from The Apache Software Foundation, Los Angeles, Calif., a user may specify within a configuration file a regular expression that is to be matched against the user-provided input for a given parameter. Other examples are commercially-available security libraries that are known to contain data sanitizers and/or data validators, and regular-expression libraries, such as the java.util.regex package in Java™.

Each of the sets of inputs 104 may include one or more test data payloads that are configured to test for one or more known security vulnerabilities, such as SQL injection, cross-site scripting, and command injection, such as where each test data payload includes a payload designed to exploit a given security vulnerability. The test data payloads may be randomly selected from a library of predefined test data payloads 106. Data-checking software tester 100 may be configured to provide the test data payloads in each set of inputs 104 as input to each set of data-checking software 102 being tested, and determine, for each of the sets of data-checking software 102, a score for each of the sets of inputs 104 indicating a degree of success of the set of inputs 104 in defeating the set of data-checking software 102 using any known success criteria and any known scoring technique.

A rule generator 108 may be configured to generate a rule 110 based on the scores of the sets of inputs 104 and on data-checking features 112 that are known to be associated with the data sanitizers/validators in the sets of data-checking software 102. For example, data-checking features 112 may indicate that a known data sanitizer in a set $DCS_1$ of data-checking software 102 has a known data-checking feature $DCF_1$ that mutates the character '<' into '<', and that a known validator in a set $DCS_2$ of the sets of data-checking software 102 has a known data-checking feature $DCF_2$ that returns an error message if an input string of a 'Name' field exceeds a predefined length. The score that is determined for a given set of inputs 104 as applied to a given set of data-checking software 102 may be associated with each of the data-checking features 112 that are known to be associated with the data sanitizers/validators in the given set of data-checking software 102, as follows:

| DCF | INP | SCORE |
| --- | --- | --- |
| $DCF_1$ | $INP_1$ | 72 |
| $DCF_1$ | $INP_2$ | 83 |
| $DCF_1$ | $INP_3$ | 34 |
| $DCF_2$ | $INP_1$ | 67 |
| $DCF_2$ | $INP_2$ | 53 |
| $DCF_2$ | $INP_3$ | 92 |

Rule generator 108 may generate the rule using this information by applying standard machine-learning techniques such as linear regression. Rule 110 may be configured to produce a testing set of one or more sets selected from the sets of inputs 104 when the rule is applied to any of the data-checking features 112 that are determined to be present in a computer software application as described below with reference to FIGS. 4 and 5. Thus, for example, a rule may be generated stating that when the $DCF_1$ and $DCF_2$ are both determined to be present in a computer software application, input sets $INP_2$ and $INP_3$ are selected for testing the computer software application as being most successful in defeating the data-checking features.

Any of the elements shown in FIG. 1 may be implemented by a computer, such as a computer 114, by implementing any of the elements in computer hardware and/or in computer software embodied in a non-transitory, computer-readable medium in accordance with conventional techniques.

Figure 2:
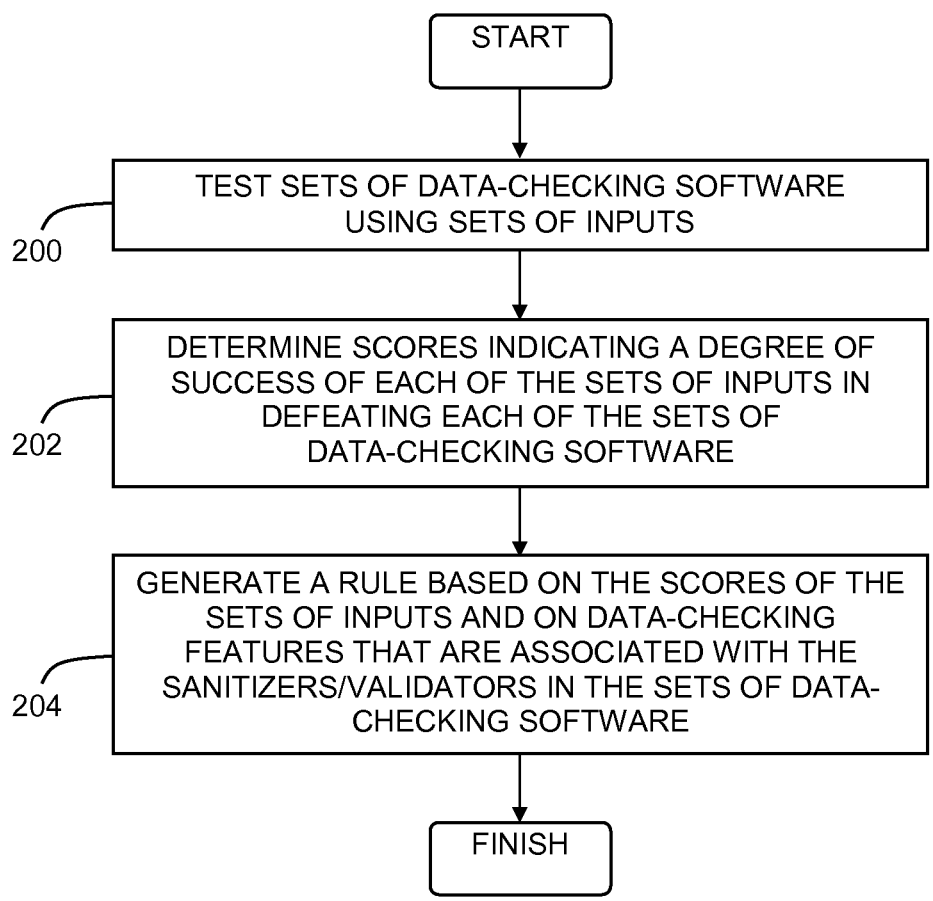
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, one or more sets of data-checking software are tested by providing one or more sets of inputs to each set of data-checking software (step 200), where each of the sets of data-checking software includes at least one data sanitizer or data validator, and where any of the sets of data-checking software may include one or more data sanitizers and/or one or more data validators. For each of the sets of data-checking software, a score is determined for each of the sets of inputs indicating a degree of success of the set of inputs in defeating the set of data-checking software using any known success criteria and any known scoring technique (step 202). A rule is generated based on the scores of the sets of inputs and on data-checking features that are associated with the data sanitizers/validators in the sets of data-checking software (step 204), where the rule may be configured to produce a testing set of one or more sets selected from the sets of inputs when the rule is applied to any subset of the data-checking features.

Figure 3:
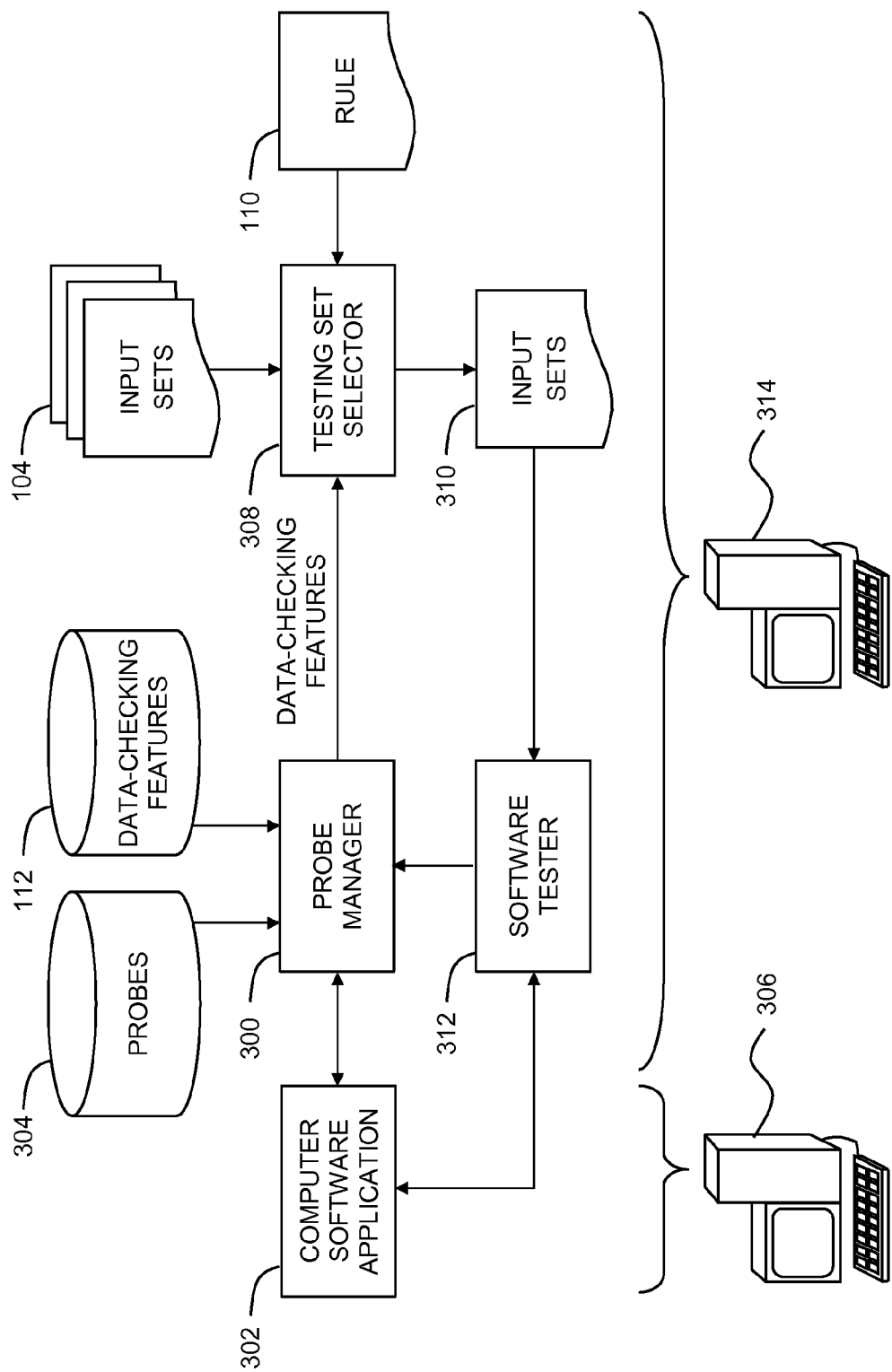
FIG. 3 is a simplified conceptual illustration of a system for testing a computer software application, constructed and operative in accordance with an embodiment of the invention.

Reference is now made to FIG. 3, which is a simplified conceptual illustration of a system for testing a computer software application, constructed and operative in accordance with an embodiment of the invention. In the system of FIG. 3, a probe manager 300 is configured to interact with a computer software application 302 using one or more predefined probes 304 to determine the presence in computer software application 302 of one or more of data-checking features 112 (FIG. 1) that are known to be associated with data sanitizers and data validators, such as by employing the XSS Analyzer feature of IBM Security AppScan™, to detect input-validation mechanisms. Computer software application 302 may by any type of computer software application, such as, for example, a "web" application including Hypertext Markup Language (HTML)-encoded web pages, where computer software application 302 is hosted by a computer 306 that is accessible via a computer network (not shown). Probe manager 300 may determine which data-checking features 112 are present in computer software application 302 by detecting and analyzing responses by computer software application 302 to interactions performed by probe manager 300 with computer software application 302. For example, data-checking features 112 may indicate that a known data sanitizer mutates the character < into <. Probe manager 300 may therefore provide to computer software application 302 input that includes the character < and determines from the response of computer software application 302 whether the character < was mutated into <, and therefore whether this data-checking feature is present in computer software application 302.

A testing set selector 308 is configured to apply rule 110 (FIG. 1) to the data-checking features 112 that are determined by probe manager 300 to be present in computer software application 302, to produce a testing set of inputs 310 selected from the sets of inputs 104 (FIG. 1). A software tester 312 is configured to test computer software application 302 using testing set of inputs 310, such as in accordance with conventional black-box testing techniques, such as by employing IBM Security AppScan™

Any of the elements shown in FIG. 3 may be implemented by a computer, such as a computer 314, by implementing any of the elements in computer hardware and/or in computer software embodied in a non-transitory, computer-readable medium in accordance with conventional techniques.

Figure 4:
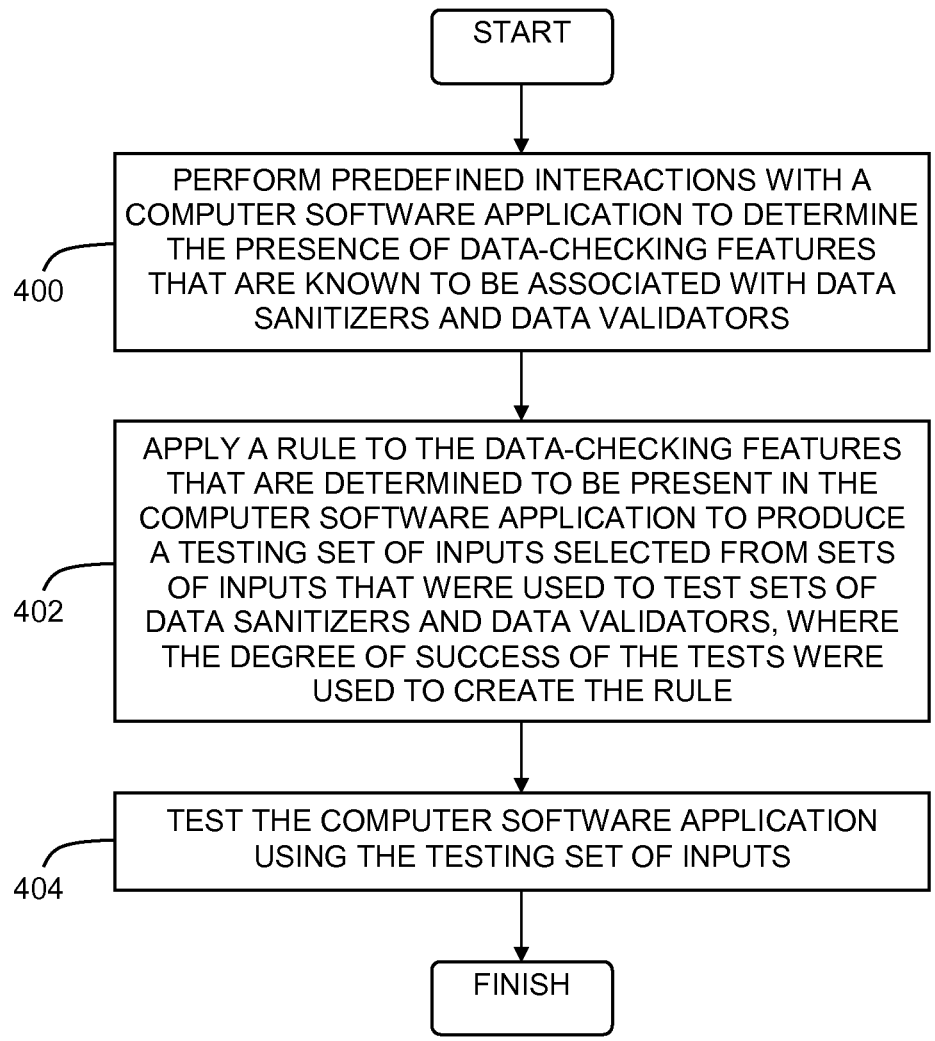
FIG. 4 is a simplified flowchart illustration of an exemplary method of operation of the system of FIG. 3, operative in accordance with an embodiment of the invention.

Reference is now made to FIG. 4, which is a simplified flowchart illustration of an exemplary method of operation of the system of FIG. 3, operative in accordance with an embodiment of the invention. In the method of FIG. 4, predefined interactions are performed with a computer software application to determine the presence in the computer software application of one or more of data-checking features that are known to be associated with data sanitizers and data validators (step 400). A rule is applied to the data-checking features that are determined to be present in the computer software application to produce a testing set of inputs selected from sets of inputs that were used to test sets of data sanitizers and data validators, where the degree of success of the tests were used to create the rule (step 402). The computer software application is then tested using the testing set of inputs (step 404), such as in accordance with conventional black-box testing techniques.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for testing computer software applications, the method comprising:
   probing, by a computer processor, a computer software application to determine the presence in the computer software application of any of a plurality of data-checking features;
   applying a rule to the data-checking features that are determined to be present in the computer software application, thereby producing a testing set of inputs,
   wherein the testing set includes at least one member selected from a plurality of sets of inputs that were used to test a plurality of sets of data-checking software, wherein each of the sets of data-checking software includes at least one member selected from a set of data sanitizers and data validators, and
   wherein the rule is configured to produce the testing set to include at least one member selected from the sets of inputs when the rule is applied to any of the data-checking features; and
   testing, by the computer processor, the computer software application using the testing set;
   wherein the applying comprises applying the rule wherein the rule is based on scores of the sets of inputs and a plurality of data-checking features associated with the sets of data-checking software, wherein each of the scores indicates, for each of the sets of data-checking software, a degree of success of the set of inputs in defeating the set of data-checking software.

2. The method according to claim 1 further comprising testing the plurality of sets of data-checking software using the plurality of sets of inputs.

3. The method according to claim 2 further comprising determining, for each of the sets of data-checking software, a score for each of the sets of inputs indicating a degree of success of the set of inputs in defeating the set of data-checking software.

4. The method according to claim 3 further comprising generating the rule based on the scores of the sets of inputs and a plurality of data-checking features associated with the sets of data-checking software.

5. A system for testing computer software applications, the system comprising:
   a computer processor;
   a probe manager executable by the computer processor, the probe manager configured to probe a computer software application to determine the presence in the computer software application of any of a plurality of data-checking features;
   a testing set selector executable by the computer processor, the testing set selector configured to apply a rule to the data-checking features that are determined to be present in the computer software application, thereby producing a testing set of inputs,
   wherein the testing set includes at least one member selected from a plurality of sets of inputs that were used to test a plurality of sets of data-checking software, wherein each of the sets of data-checking software includes at least one member selected from a set of data sanitizers and data validators, and
   wherein the rule is configured to produce the testing set to include at least one member selected from the sets of inputs when the rule is applied to any of the data-checking features; and
   a software tester, executable by the computer processor, the software tester configured to test the computer software application using the testing set;
   wherein the rule is based on scores of the sets of inputs and a plurality of data-checking features associated with the sets of data-checking software, wherein each of the scores indicates, for each of the sets of data-checking software, a degree of success of the set of inputs in defeating the set of data-checking software.

6. The system according to claim 5 further comprising a data-checking software tester executable by the computer processor, the data-checking software tester configured to test the plurality of sets of data-checking software using the plurality of sets of inputs.

7. The system according to claim 6 wherein the data-checking software tester is configured to determine, for each of the sets of data-checking software, a score for each of the sets of inputs indicating a degree of success of the set of inputs in defeating the set of data-checking software.

8. The system according to claim 7 further comprising a rule generator executable by the computer processor, the rule generator configured to generate the rule based on the scores of the sets of inputs and a plurality of data-checking features associated with the sets of data-checking software.

9. A computer program product for testing a computer software application, the computer program product comprising:
- a computer-readable storage medium; and
- computer-readable program code embodied in the computer-readable storage medium, wherein the computer-readable program code is configured to
  - probe a computer software application to determine the presence in the computer software application of any of a plurality of data-checking features,
  - apply a rule to the data-checking features that are determined to be present in the computer software application, thereby producing a testing set of inputs,
  - wherein the testing set includes at least one member selected from a plurality of sets of inputs that were used to test a plurality of sets of data-checking software, wherein each of the sets of data-checking software includes at least one member selected from a set of data sanitizers and data validators, and
  - wherein the rule is configured to produce the testing set to include at least one member selected from the sets of inputs when the rule is applied to any of the data-checking features, and
  - test the computer software application using the testing set;
  - wherein the rule is based on scores of the sets of inputs and a plurality of data-checking features associated with the sets of data-checking software, wherein each of the scores indicates, for each of the sets of data-checking software, a degree of success of the set of inputs in defeating the set of data-checking software.

10. The computer program product according to claim 9 wherein the computer-readable program code is configured to test the plurality of sets of data-checking software using the plurality of sets of inputs.

11. The computer program product according to claim 10 wherein the computer-readable program code is configured to determine, for each of the sets of data-checking software, a score for each of the sets of inputs indicating a degree of success of the set of inputs in defeating the set of data-checking software.

12. The computer program product according to claim 11 wherein the computer-readable program code is configured to generate the rule based on the scores of the sets of inputs and a plurality of data-checking features associated with the sets of data-checking software.

* * * * *